Jan. 18, 1938.　　　　　O. MUELLER　　　2,105,926
MANUAL CONTROL FOR AUTOMOBILE GENERATORS
Filed Nov. 18, 1935
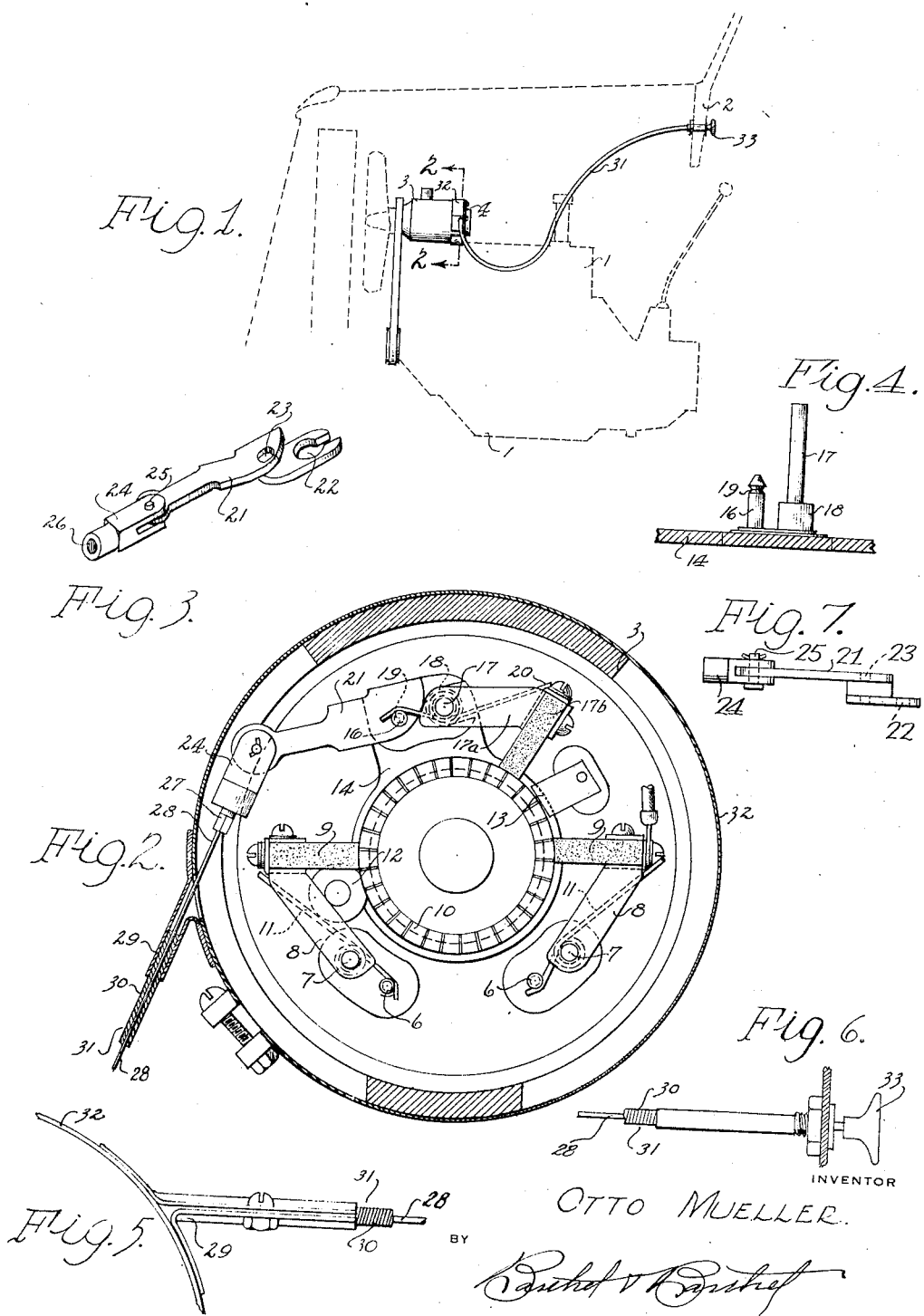
INVENTOR
OTTO MUELLER
BY
ATTORNEY Patented Jan. 18, 1938

2,105,926

UNITED STATES PATENT OFFICE 2,105,926

MANUAL CONTROL FOR AUTOMOBILE GENERATORS

Otto Mueller, Toledo, Ohio

Application November 18, 1935, Serial No. 50,320

6 Claims. (Cl. 171—324)

This invention relates to controlling means for automotive vehicle generators and more particularly to means adapted to be assembled on generators now in use.

It is well known that the load on the storage battery of an automotive vehicle varies in accordance with conditions under which the vehicle is operated whereas the charging rate of the generator, which supplies the electric current to the battery, ordinarily remains constant for given speeds of operation. When the vehicle lights are operated continuously the battery is subjected to a continuous drain and if the generator is not regulated to accommodate such a condition there is a possibility of the battery supply being depleted. The same is true to a greater degree when an automobile radio derives its current supply from the vehicle battery.

In order that the generator output may be regulated to conform to the amount of current actually being consumed by the operation of electrically operated vehicle accessories, the present invention provides manual means whereby the charging rate of a generator may be increased or decreased in accordance with the load upon the battery.

An important object of the invention is to provide means which may be easily operated at a point remote from the generator for varying the charging rate in accordance with the load on the battery.

Still another object of the present invention is to provide means for regulating the power output of an automotive vehicle generator, which is adapted for installation upon conventional generators already in use without necessitating any structural changes in the generator, and which when assembled, may be actuated manually from a point on the instrument board of the vehicle.

With the above and other ends in view the invention is more fully disclosed with reference to the accompanying drawing, in which—

Figure 1 is an elevation of a generator and a control means therefor;

Fig. 2 is a section taken on the line 2—2 of Fig. 1;

Fig. 3 is a perspective view of a detail;

Fig. 4 is a fragmentary section illustrating a detail;

Fig. 5 is an elevation of a detail,

Fig. 6 is a fragmentary elevation of a part of the control apparatus, and

Fig. 7 is an elevation of the detail shown in Fig. 3.

Like characters of reference are employed throughout to designate corresponding parts.

The reference character 1 designates an automobile engine and 2 the vehicle dash or instrument board. Secured to the engine in the usual manner is an electric generator housing 3 having a removable end plate 4 secured to the housing by bolts in the usual manner. Secured to the end plate 4 are pairs of stationary pins 6 and 7, perpendicular in respect to the end plate 4. The pins 6 pivotally support rocker arms 8 having brushes 9 on their outer ends adapted for engagement with the commutator 10. Springs 11 encircle the pins 7, each spring having one of its ends bearing against its respective rocker arm 8 and its other end extending into a circumferential groove in its respective pin 6. The springs 11 resiliently urge pivotal movement of their respective rocker arms so as to maintain the brushes 9 in engagement with the commutator 10.

Rotatably secured on a bearing on the end plate 4 by elements 12 and 13 is an annular element 14, in accordance with conventional practice. Secured to and extending perpendicular from the face of the annular element are two pins 16 and 17, the pin 17 having an enlarged base 18, and the pin 16 having a circumferential groove 19 adapted to receive one end of a spring 20. Pivotally mounted on the pin 17 is a rocker arm 17a having a brush 17b on its outer end adapted for engagement with the commutator 10. The above mentioned spring 20, which is sleeved on the pin 17, has its other end engaging the rocker arm 17a to yieldably hold the brush 17b against the commutator 10.

An adapter 21 having a slot 22 in one end and an aperture 23 spaced inwardly from said end, is received on the pins 16 and 17, the slot 22 fitting over the base 18 of pin 17 and the aperture 23 fitting over the pin 16. The adapter is preferably formed of metal completely inclosed in a coating of insulation material, or it may be formed of insulating material. A connecting element 24 is pivotally attached to the adapter 21 by a pin 25 and contains a threaded aperture 26 receiving a threaded male part 27 secured on the movable part 28 of a Bowden wire generally designated 31.

A socket 29 receives one end of the Bowden wire flexible sheath 30, the socket being secured to a band 32 by welding or similar means. Fastened to the opposite end of the wire element 28 is a knob 33 by means of which manual pressure may be applied to the movable wire 28 to move the same with respect to the stationary sheath 30.

In the order of operation, when the knob 33 is moved manually it actuates the adapter 21 and transmits motion to the rotatable annular element 14 which carries the brush 17b in either a clockwise or counter-clockwise direction according to the direction of movement of the element 28. Movement of the brush 17b and its support in one direction causes the generator output to be increased and movement in the opposite direction causes the generator output to be decreased.

Although a specific embodiment of the invention has been illustrated and described it will be understood that various changes may be made within the scope of the appended claims without departing from the spirit of the invention, and such changes are contemplated.

What I claim is:—

1. Controlling means for adjustment of a brush support having a pair of pins thereon, comprising a brush carrying member pivoted on one of said pins, a spring engaging the other pin and said brush carrying member, an adaptor having apertures therein removably fitting over said projecting pins on said brush support and secured thereon by said spring, and manual means for moving said adaptor from a point remote from said generator.

2. Controlling means for adjustment of a brush carrying member in a generator having an end plate, comprising in combination, a commutator, pins projecting from said end plate, rocker arms pivotally secured to said pins, brushes secured to said rocker arms, an annular element rotatably secured to said end plate, pins projecting laterally from said annular element, an adaptor having a pair of apertures adjacent one end and fitting over said pins, a connecting link pivotally connected to the other end of said adaptor, and manual means for moving said connecting link from a point remote from said generator.

3. In combination with an electric generator having a movable brush support, a pair of pins extending perpendicular to the face of said brush support, a brush supporting rocker arm pivotally mounted on one of said pins, a spring having one end engaging said rocker arm and its other end engaging the other of said pins whereby to resiliently urge movement of said rocker arm in one direction, an adapter having means engaging both of said pins for support thereon and retained thereon by said spring, and a flexible element connected to said adapter and extending to a point remote from said generator.

4. In combination with an electric generator having a movable brush support, a pair of pins extending perpendicular to the face of said brush support, a brush supporting rocker arm pivotally mounted on one of said pins, a spring having one end engaging said rocker arm and its other end engaging the other of said pins whereby to resiliently urge movement of said rocker arm in one direction, a rigid element having means engaging said pins to hold it stationary with respect thereto, said rigid element being disposed between said rocker arm and the face of said brush support whereby said rocking ram retains said rigid element from displacement off the ends of said pins, and a flexible element connected to one end of said rigid element and extending to a point remote from said generator.

5. In combination with a movable brush support for an electric generator, a pair of pins extending perpendicular to the face of said support, one of said pins having a groove, a rocker arm on the other of said pins, a spring engaging said rocker arm to yieldably urge movement thereof in one direction, said spring having a projecting end received in said groove and engaging said rocker arm to prevent displacement thereof from its supporting pin, an adapter engaging said pins and interposed between said rocker arm and the face of said brush support and held against displacement from said pins by said rocker arm and spring, and a flexible actuating element connected to said adapter and extending to a point remote from said generator.

6. In combination with a generator having a movable brush support and a pair of pins thereon, a rocker arm pivotally mounted on one pin, a spring urging movement of said rocker arm in one direction and engaging a recess in the other pin to prevent displacement of said rocker arm from its supporting pin, an adapter having apertures fitting over said pins and held against displacement from said pins by said rocker arm and spring, and a flexible connector attached to said adapter and extending to a point remote from said generator.

OTTO MUELLER.